United States Patent Office 2,833,804
Patented May 6, 1958

2,833,804

PRODUCTION OF ORGANIC ACIDS FROM OXY-GENATED ORGANIC COMPOUNDS

Karol L. Hujsak and Richard Mungen, Tulsa, Okla., assignors to Pan American Petroleum Corporation, a corporation of Delaware No Drawing. Original application December 7, 1953, Serial No. 396,624, now Patent No. 2,770,635, dated November 13, 1956. Divided and this application May 31, 1956, Serial No. 588,238

7 Claims. (Cl. 260—450)

Our invention relates to a novel method for increasing the concentration of organic acids present in mixtures containing other oxygenated organic compounds. More particularly, it pertains to a method whereby organic acids may be selectively obtained in increased ratio to the remaining classes of oxygenated organic compounds present in said mixtures.

Mixtures of oxygenated organic compounds of the type contemplated by our invention may be derived from any number of sources. Typical of such mixtures are those encountered in the oxidation of hydrocarbons where oil and aqueous phases are obtained, both of which contain oxygenated organic compounds. Another important source of such mixtures is the Fischer-Tropsch synthesis which, in addition to an oil layer containing oxygenated organic compounds, yields a water layer containing not only lower primary and secondary alcohols, but also various other oxygenated organic compounds including ketones, aldehydes and esters. While it is to be strictly understood that our invention is not limited to the utilization of mixtures of oxygenated organic compounds typical of those obtained in the Fischer-Tropsch synthesis, the present disclosure is based principally on the application of our invention to such mixtures.

In accordance with the now generally practiced modification of the Fischer-Tropsch synthesis, carbon monoxide and hydrogen in a ratio of about 1:2 are introduced into a suitable reactor at temperatures of from 260° to 370° C. and pressures of the order of 150 to 550 p. s. i. to produce a product mixture containing hydrocarbons, oxygenated organic compounds and water. Thereafter this mixture is further separated into a gas phase, a liquid hydrocarbon phase and a water phase. While this reaction is generally associated with the synthesis of hydrocarbons predominantly of the gasoline boiling range or the synthesis of hydrocarbons which can readily be converted into a fraction boiling in the aforesaid range, such reaction is likewise a very valuable source of aldehydes, ketones, acids and alcohols. This chemicals fraction may frequently constitute as much as 25 weight percent or more of the total, viz., hydrocarbons plus chemicals, and is generally found to be substantially equally distributed in the hydrocarbon or oil and water phases. The quantity of chemicals involved in a reaction of this type may be further appreciated when it is realized that the daily production of total chemicals from hydrocarbon synthesis plants now designed for commercial purposes is of the order of 500,000 pounds. However, the complexity of such chemical mixtures, even after they have been split into oil and water-soluble fractions, has apparently discouraged some of the principal workers in this field from attempting to isolate these materials in a substantially pure state. In the past a proposed solution to this problem consisted of recycling the water-soluble chemicals back to the synthesis unit where they were mixed with synthesis gas and converted predominantly to gasoline hydrocarbons. It was further proposed to remove the oil-soluble chemicals from the oil phase, for example, by extraction with a suitable solvent, separate the chemicals from the resulting extract and thereafter recycle them to the synthesis reactor where they were converted chiefly into gasoline hydrocarbons. If, on the other hand, it was desired to recover the oil and water-soluble chemicals fraction, this object was accomplished by means of a series of complicated chemical and physical separation steps. It will be apparent to those skilled in the art, however, that because of the extreme difficulty encountered in the separation of the complex chemical mixtures involved, viz., the separation of a single component from an azeotropic mixture in which the other components form azeotropes with one another as well as with the component which it is desired to isolate, any system capable of satisfactorily accomplishing this object will add many thousands of dollars to the total construction cost of a commercial plant.

It is therefore an object of our invention to provide a method whereby the composition of the water-soluble chemicals fraction, as well as the oil-soluble chemicals fraction—if desired—may be controlled, thus rendering our process extremely flexible and making possible the production of only those chemicals that are economically attractive at current market conditions. A further object of our invention is to provide a method by which a selected class or classes of chemicals may be continuously produced to the exclusion of hydrocarbon synthesis and other classes of chemicals present in the feed mixtures employed. A still further object of our invention is to provide a commercially practicable method by which acids may be continuously produced from the remaining classes of chemicals present in the feed mixtures employed to the substantial exclusion of other undesired chemicals.

In our copending application U. S. Serial No. 101,986, filed June 29, 1949, now U. S. 2,756,248, we disclose a method whereby aqueous mixtures of oxygenated organic compounds of the type herein set forth may be converted in the presence of a suitable catalyst into ketones alone or into a mixture of ketones and acids by varying the temperatures and pressures to which said aqueous mixtures are subjected. Also, in our patent U. S. 2,642,388, we teach a process whereby similar aqueous mixtures of oxygenated organic compounds may be selectively and separately converted in the presence of a suitable catalyst into ketones or alcohols or into a mixture of ketones and alcohols by varying the temperatures, pressures and hydrogen concentrations to which said aqueous mixtures are subjected. While both of the methods referred to above are in many respects relatively flexible in so far as concerns the classes of products and proportions thereof that may be obtained from the starting materials employed therein, neither of the aforesaid processes provides a means for producing from such mixtures organic acids alone. It will be apparent to those familiar with the art to which the present invention is directed that a method of the latter type is highly desirable in order to round out a series of processes capable of using a common starting material to produce a different end product or different combinations of end products to meet a wide range of market demands as well as other economic factors.

We have now discovered a process by which chemical mixtures of the type encountered in hydrocarbon synthesis may be converted into acids in the presence of a suitable catalyst. Broadly, our invention contemplates subjecting mixtures of oxygenated organic compounds of the general type obtained in the hydrocarbon synthesis water stream to the action of carbon dioxide, in varying proportions, in the presence of a catalyst at temperatures and pressures which may—although not necessarily—fall within the ranges employed in the hydrocarbon synthesis, to produce organic acids. In accordance with a preferred embodiment of our invention, the reaction mixture containing oxygenated organic compounds such as, for example, aldehydes, alcohols, acids and ketones, is introduced into a reactor of the general design employed in hydrocarbon synthesis where conversion occurs in the presence of a suitable fluidized hydrocarbon synthesis catalyst such as, for example, iron, at a temperature of from about 145° to about 360° C. and at pressures of from about 200 to 600 p. s. i., and above, in the presence of carbon dioxide. Thus, by treating a mixture of the aforesaid oxygenated organic compounds under the above-mentioned conditions of temperature and pressure in the presence of carbon dioxide, but in the substantial absence of hydrogen, i. e., less than about 10 mol percent of the hydrogen-carbon dioxide mixture, a marked increase is obtained in the acid content of the original feed mixture at the expense of aldehydes, ketones and alcohols. In general, the lower the hydrogen concentration of the reaction mixture, the more favorable are the conditions for the synthesis of acids. The concentration of carbon dioxide in reaction mixtures employed where maximum acid production is achieved is generally found to amount to from about 40 to 50 mol percent, or higher, whereas the concentration of hydrogen does not generally exceed 10 mol percent. In this connection, it is to be pointed out that although the conditions utilized, i. e., temperature, pressure and catalysts, may be substantially identical to those employed in ordinary hydrocarbon synthesis, no formation of hydrocarbons occurs in the process of our invention owing to the absence from the reaction mixture of hydrogen and carbon monoxide in synthesis proportions.

At a pressure of 450 p. s. i., for example, but at a temperature above 315° C., the yield of alcohols is decreased and the acid yield is increased. Moreover, it has been our general observation that optimum increases in acid concentrations are secured when employing carbon dioxide in an amount constituting from about 50 to about 67 mol percent of the total feed stream.

The composition of the feed mixture may vary widely. Where acids are the desired end product, no water need be present; however, as a practical matter, water may be present and its presence aids the formation of acids by suppressing ketone formation from the acids and by reaction with aldehydes in a manner similar to the reaction of aldehydes with carbon dioxide to form acids. In employing the process of our invention in conjunction with the hydrocarbon synthesis process, we have found it satisfactory to use feeds, viz., primary water (the aqueous phase in the orginial hydrocarbon synthesis product mixture) in which the chemicals (ketones, aldehydes, acids and alcohols) are present to the extent of from about 5 to 15 weight percent, usually about 7.5 weight percent. In general, the majority of chemicals present in the primary water comprise essentially acetaldehyde, ethanol, acetic acid and acetone, with smaller amounts of isopropyl alcohol, n-butanol, methyl propyl ketone, methyl ethyl ketone, propionic acid, etc. Such compounds present in smaller amounts are hereinafter referred to as "other chemicals." The composition of the feed mixture employed may be further varied by introducing into the feed mixture the still residue or overhead impurities obtained in separating the increased quantities of ketones or acids from the product mixtures obtained in accordance with the process of our invention. If desired, the feed composition may be varied by adding thereto substantially hydrocarbon-free mixtures of higher aldehydes, and alcohols derived from the oil-soluble fraction produced in hydrocarbon synthesis to obtain the acids in increased concentration over that normally occurring in said water-soluble fraction. Additionally, we wish to point out that the primary hydrocarbon synthesis oil stream, either prior or subsequent to removal of the acids initially present therein, may be utilized as a suitable feed mixture in carrying out the process of our invention. The use of the primary oil as a feed mixture in our process we regard to be an especially outstanding contribution to a long-existing problem, i. e., the recovery of oil-soluble oxygenated chemicals in usable form from the synthesis oil. The concentration of such chemicals in the oil stream, including aldehydes, alcohols and ketones, is frequently found to constitute as much as 30 weight percent of the oil. By our invention these oxygenates can all be converted into acids, the acids subsequently neutralized and the resulting salts recovered, thus affording a convenient and efficient method for obtaining these otherwise difficultly-isolatable compounds.

With feed streams containing alcohols, ketones and aldehydes, the reactions involved when such mixtures are subjected to the action of carbon dioxide, under the conditions of the process of our invention, appear to be as indicated by the following equations, using ethanol, acetaldehyde and acetone as representative examples of their respective classes:

$$CH_3CH_2OH + 2CO_2 \rightleftharpoons CH_3COOH + H_2O + 2CO$$
$$CH_3CHO + CO_2 \rightleftharpoons CH_3COOH + CO$$
$$CH_3COCH_3 + CO_2 + H_2O \rightleftharpoons 2CH_3COOH$$

Thus, it may be seen that with feed mixtures in which alcohols and ketones are present in essentially the same molecular proportions, no additional water is necessary to convert all of the above-indicated classes of compounds to acids. Also, in instances where no ketones are present, alcohols and aldehydes may be converted to their corresponding acids in the absence of water other than that generated in the conversion of alcohols to acids.

The catalyst employed in effecting our invention may be any of those that have previously been shown to be capable of promoting hydrocarbon synthesis together with appreciable quantities of oxygenated hydrocarbons by means of the reduction of carbon monoxide with hydrogen. Typical of such catalysts are those mentioned in the recent publication of Storch, et al., entitled The Fischer-Tropsch and Related Syntheses, published by John Wiley & Sons, Inc., New York, 1951. Among the hydrocarbon synthesis catalysts disclosed in the aforesaid reference are cobalt, nickel, ruthenium and iron. In fluidized bed operations, the catalyst is preferably employed in a state and under conditions such that the density of the catalyst bed ranges from about 65 to about 100 pounds per cubic foot and preferably 85 to 100 pounds per cubic foot in the case of iron. The catalyst is maintained in a fluidized state under the reaction conditions employed by introducing the feed mixture in vaporous form at a linear velocity of between about 0.1 and 2.0 feet per second. The concentration of catalyst employed in liquid phase processes may vary widely and, in general, will be determined by the activity of the particular catalyst employed. Thus, for example, with iron-type hydrocarbon synthesis catalysts, we prefer to use a concentration of approximately one pound of catalyst for each 0.2 to 0.5 mol of reaction mixture.

While the process of our invention referred to above and more specifically described below is disclosed generally in terms of vapor phase operation, it is to be strictly understood that we do not limit ourselves to such operating conditons, inasmuch as batch or continuous liquid phase operations may be advantageously employed with various combinations of feed mixtures, catalysts, reaction temperatures and pressures. Also, in carrying out our invention, the vapor phase conversion of oxygenated organic chemicals in accordance therewith may—if desired—be effected in reactors having fixed instead of fluidized catalyst beds.

Our invention may be further illustrated by the following specific example:

EXAMPLE

A primary water stream from a hydrocarbon synthesis operation at 315° C. and 450 p. s. i. pressure was introduced into a suitable hydrogenation apparatus equipped with a multiple blade stirrer and containing an iron-type hydrocarbon synthesis catalyst. The temperature of the primary water was then brought to about 150° C. after which the pressure was increased to approximately 450 p. s. i. by the introduction of carbon dioxide into the reaction chamber. The resulting reaction mixture contained about one volume of carbon dioxide for each volume of primary water. The iron catalyst was employed in a concentration of approximately one pound of catalyst for each 0.2 to 0.5 mol of the reaction mixture. Under the conditions of temperature and pressure employed, the reaction mixture was partially vaporized. During the course of the reaction, sufficient carbon dioxide was introduced to maintain a pressure of approximately 450 p. s. i., while the reaction mixture was continuously agitated. When the reaction reached completion, the resulting mixture was withdrawn from the apparatus and analyzed. Analysis indicated a product mixture of the following composition with a gain in acetic acid of 400 weight percent over that present in the original feed as shown below:

Table

| Component | Reaction Mixture, Mols | Product Mixture, Mols | Percent Gain |
|---|---|---|---|
| $CH_3CHO$ | .21 | .002 | |
| $CH_3CH_2OH$ | 1.33 | .45 | |
| $CH_3COOH$ | .37 | 1.85 | 400 |
| $H_2O$ | 46.47 | 45.18 | |
| $CH_3COCH_3$ | .20 | .01 | |
| $H_2$ | 0 | 1.98 | |
| $CO_2$ | 50.00 | 49.81 | |
| Other Chemicals | 1.42 | 1.42 | |

From the data appearing above, it will be noted that although no hydrogen was initially present in the reaction mixture, approximately 2 mol percent was found to be present in the product mixture analyzed. It will be further noted that substantially all of the acetaldehyde and acetone and 66 percent of the ethanol were converted to acetic acid. By increasing the temperature of the reaction mixture to approximately 205° C. or by increasing the carbon dioxide concentration thereof to about 66 to 68 mol percent and employing the same temperature and pressure as first mentioned in the above example, the reaction mixture will be completely vaporized, which would then permit the utilization of a fluidized system. Either of the sets of conditions just mentioned will result in an increase in acid concentration at the expense of the aldehydes, alcohols and ketones present in the reaction mixture.

From the foregoing it is clear that we have provided a process for substantially increasing the individual concentration of acids originally present in mixtures of the type herein set forth. Our invention further contemplates application of the principles specifically disclosed above to the treatment of any mixture of chemicals in which compounds of the classes taught therein are present and the source from which mixtures are derived is immaterial. In this connection, it is to be understood that the process of our invention is generally applicable to acids, i. e., aliphatic, cycloaliphatic, aromatic and the like.

It will be apparent to those skilled in the art that numerous modifications in methods of processing, synthesis conditions and refining of the product mixtures may be employed without departing from the scope of our invention. For example, the acids initially present in the hydrocarbon synthesis primary water may be removed prior to reaction of the latter with carbon dioxide either by extraction or neutralization. Such a step preceding the treatment with carbon dioxide results in a greater quantity of aldehyde and alcohol being converted to acid in a single pass over the catalyst. By recycling all of the acid-free primary water over the catalyst, it is evident that the net products of the system will consist essentially of organic acids.

In general, it may be said that our invention covers a method for altering the concentration of acids contained in a mixture thereof by treating said mixture with varying quantities of carbon dioxide under conditions such that the desired conversion is effected in the substantial absence of hydrocarbon synthesis.

This application is a division of our copending application Serial No. 396,624, filed December 7, 1953, now U. S. Patent No. 2,770,635.

We claim:

1. In a process for converting into organic acids a mixture of aldehydes and ketones, the step which comprises subjecting said mixture to the action of a gas consisting primarily of carbon dioxide in the presence of a hydrocarbon synthesis catalyst but in the absence of hydrocarbon synthesis at pressures ranging upwardly from about 200 p. s. i. and temperatures of from about 145° to about 360° C., said carbon dioxide being the only component reacting with said mixture of aldehydes and ketones.

2. The process of claim 1 in which pressures ranging from about 400 to about 550 p. s. i. and temperatures of from about 250° to about 315° C. are employed.

3. The process of claim 2 in which an iron hydrocarbon synthesis catalyst is employed.

4. In a process for the production of organic acids, the step which comprises subjecting raw primary hydrocarbon synthesis oil containing aldehydes and alcohols to the action of carbon dioxide in the presence of a hydrocarbon synthesis catalyst but in the absence of hydrocarbon synthesis at pressures ranging upwardly from about 200 p. s. i. and temperatures of from 145° to about 360° C., said carbon dioxide being the only component reacting with said hydrocarbon synthesis oil containing aldehydes and alcohols.

5. A process for increasing the proportion of organic acids present in a mixture containing aldehydes and alcohols, which comprises subjecting said mixture to the action of carbon dioxide in the presence of a hydrocarbon synthesis catalyst but in the absence of hydrocarbon synthesis at pressures ranging upwardly from about 200 p. s. i. and temperatures of from about 425° to about 650° C., said carbon dioxide being the only component reacting with said mixture of aldehydes and alcohols, and thereafter recovering a mixture in which organic acids are present in increased ratio to the remaining components of the mixture thus recovered.

6. The process of claim 5 in which the pressure ranges from about 400 to about 550 p. s. i. and the temperature ranges from about 250° to about 315° C.

7. A process for increasing the proportion of organic acids present in a mixture containing at least one of the group consisting of aldehydes and alcohols which comprises subjecting said mixture to the action of carbon dioxide in the presence of a hydrocarbon synthesis catalyst but in the absence of hydrocarbon synthesis at pressures ranging upwardly from 200 p. s. i. and temperatures of from 145° to about 360° C., said carbon dioxide being the only component reacting with said mixture containing at least one of the group consisting of aldehydes and alcohols.

References Cited in the file of this patent

UNITED STATES PATENTS

| | | |
|---|---|---|
| 2,516,958 | Coley | Aug. 1, 1950 |
| 2,521,436 | Worsham et al. | Sept. 5, 1950 |
| 2,569,380 | Holder | Sept. 25, 1951 |
| 2,585,981 | Watson | Feb. 9, 1952 |
| 2,762,829 | Kratzer et al. | Sept. 11, 1956 |
| 2,770,635 | Hujsak et al. | Nov. 13, 1956 |

UNITED STATES PATENT OFFICE

CERTIFICATE OF CORRECTION

Patent No. 2,833,804  May 6, 1958

Karol L. Hujsak et al.

It is hereby certified that error appears in the above numbered patent requiring correction and that the said Letters Patent should read as corrected below.

Column 6, line 46, for "425° to about 650° C." read -- 145° to about 360° C. --.

Signed and sealed this 12th day of August 1958.

(SEAL)
Attest:

KARL H. AXLINE
Attesting Officer

ROBERT C. WATSON
Commissioner of Patents